2,977,209

METHOD OF COMBATTING WEEDS

Harry Tilles, El Cerrito, and Joe Antognini, Mountain View, Calif., assignors to Stauffer Chemical Company, a corporation of Delaware No Drawing. Filed Feb. 13, 1957, Ser. No. 639,852

4 Claims. (Cl. 71—2.3)

This invention relates to certain aryl, both substituted and unsubstituted, thiolcarbamates as herbicides. More specifically, the invention relates to compounds of the general formula $$R_1S-\overset{O}{\underset{\|}{C}}-N\overset{R_2}{\underset{R_3}{\diagdown}}$$

wherein $R_1$ is an aryl or substituted aryl group, $R_2$ is hydrogen, an alkyl or an allyl group, and $R_3$ is an alkyl, an allyl group, or a hydrogen (provided that $R_2$ is not also a hydrogen).

Preferred substituent groups are:

| $R^1$ | $R^2$ and/or $R^3$ |
|---|---|
| phenyl | H |
| p-chlorophenyl | $CH_3$ |
| p-tolyl | $C_2H_5$ |
| p-ethoxphenyl | $n-C_3H_7$ |
| 2,4-dimethylphenyl | $i-C_3H_7$ |
|  | $i-C_4H_9$ |
|  | $n-C_4H_9$ |
|  | allyl |

The novel compounds of the present invention may be made in accordance with the following non-limiting examples. Code numbers have been assigned to each compound and are used throughout the balance of the application.

*Example I (R-2097)*

10 g. (0.058 mole) of phenyl chlorothiolformate was dissolved in 125 cc. of ethyl ether and the solution was cooled to 5–10° C. in an ice bath. 13.4 g. (0.119 mole) of 40% dimethylamine solution in water was slowly added, keeping the reaction mixture cool by means of the ice bath. The ether solution was then separated from the aqueous phase, dried over anhydrous magnesium sulfate and the ether was then evaporated on the steam bath with the aid of a current of air. There was obtained as a residue, 10.3 g. of phenyl N,N-dimethylthiolcarbamate, $n_D^{29}$ 1.541.

*Example II (R-2098)*

10 g. (0.058 mole) of phenyl chlorothiolformate was dissolved in 125 cc. of ethyl ether and the solution was cooled to 5–10° C. in an ice bath. 8.7 g. (0.119 mole) of diethylamine was slowly added, keeping the reaction mixture cool by means of the ice bath. The reaction mixture was then filtered from the solid amine hydrochloride and the ether filtrate was concentrated on a steam bath with the aid of a current of air. There was obtained as a residue, 10.8 g. of phenyl N,N-diethylthiolcarbamate, $n_D^{26.5}$ 1.5594.

*Example III (R-2099)*

When the general procedure of Example II was repeated except that 12.0 g. (0.119 mole) of di-n-propylamine and 10 g. (0.058 mole) of phenyl chlorothiolformate were employed, there was obtained 14.2 g. of phenyl N,N-di-n-propylthiolcarbamate, $n_D^{26.5}$ 1.5418.

*Example IV (R-2101)*

When the general procedure of Example II was repeated except that 12.0 g. (0.119 mole) of di-isopropylamine and 10 g. (0.058 mole) of phenyl chlorothiolformate were employed, there was obtained 13.5 g. of phenyl N,N-di-isopropylthiolcarbamate, M.P. 98.5–102.5° C.

*Example V (R-2103)*

When the general procedure of Example II was repeated except that 15.3 g. (0.119 mole) of di-isobutylamine and 10 g. (0.058 mole) of phenyl chlorothiolformate were employed, there was obtained 15.1 g. of phenyl N,N-di-isobutylthiolcarbamate, $n_D^{26.5}$ 1.5310.

*Example VI (R-2104)*

When the general procedure of Example II was repeated except that 10.4 g. (0.119 mole) of N-methylbutylamine and 10 g. (0.058 mole) of phenyl chlorothiolformate were employed, there was obtained 12.9 g. of phenyl N-methyl-N-n-butylthiolcarbamate, $n_D^{25}$ 1.5517.

*Example VII (R-2105)*

When the general procedure of Example II was repeated except that 12.0 g. (0.119 mole) of N-ethyl-n-butylamine and 10 g. (0.058 mole) of phenyl chlorothiolformate were employed, there was obtained 13.9 g. of phenyl N-ethyl-N-n-butylthiolcarbamate, $n_D^{25}$ 1.5443.

*Example VIII (R-2107)*

When the general procedure of Example I was repeated except that 7.7 g. (0.119 mole) of 70% aqueous ethylamine solution and 10 g. (0.058 mole) of phenyl chlorothiolformate were employed, there was obtained 6.4 g. of phenyl N-ethylthiolcarbamate, M.P. 69–76°.

*Example IX (R-2108)*

When the general procedure of Example II was repeated except that 7.0 g. (0.119 mole) of n-propylamine and 10 g. (0.058 mole) of phenyl chlorothiolformate were employed, there was obtained 10.3 g. of phenyl N-n-propylthiolcarbamate, M.P. 70.5–75°.

*Example X (R-2109)*

When the general procedure of Example II was repeated except that 8.7 g. (0.119 mole) of n-butylamine and 10 g. (0.058 mole) of phenyl chlorothiolformate were employed, there was obtained 11.9 g. of phenyl N-n-butylthiolcarbamate, $n_D^{27.5}$ 1.5547.

*Example XI (R-2110)*

When the general procedure of Example II was repeated except that 11.5 g. (0.119 mole) of diallylamine and 10 g. (0.058 mole) of phenyl chlorothiolformate were employed, there was obtained 13.6 g. of phenyl N,N-diallylthiolcarbamate, $n_D^{25}$ 1.5675.

*Example XII (R-2111)*

When the general procedure of Example II was repeated except that 6.8 g. (0.119 mole) of allylamine and 10 g. (0.058 mole) of phenyl chlorothiolformate were employed, there was obtained 11.1 g. of phenyl N-allylthiolcarbamate, $n_D^{25}$ 1.5828.

*Example XIII (R-2112)*

When the general procedure of Example II was repeated except that 4.5 g. (0.099 mole) of anhydrous dimethylamine and 10 g. (0.048 mole) of p-chlorophenyl chlorothiolformate were employed, there was obtained 9.9 g. of p-chlorophenyl N,N-dimethylthiolcarbamate, M.P. 75–80°.

Example XIV (R-2169)

A four neck 500 cc. flask was set up with stirrer, condenser, thermometer and constant pressure dropping funnel. The apparatus was flushed with argon and sodium dispersion equivalent to 2.4 g. (0.105 mole) of sodium was added to the flask. This was followed by the addition of 125 cc. of xylene. The mixture was heated to 110° C. and then 13.6 g. (0.110 mole) of p-toluenethiol dissolved in 25 cc. of xylene was added slowly. After all of the sodium had reacted, the mixture was heated to reflux and 10.8 g. (0.100 mole) of dimethyl carbamyl chloride was added over an interval of 5 minutes. The mixture was refluxed for an additional 10 minutes and was then cooled to room temperature. The reaction mixture was then washed with 1–100 cc. portion of 2% sodium hydroxide solution and 1–100 cc. portion of water. The xylene solution was then dried over anhydrous magnesium sulfate and the solvent was evaporated on the steam bath with the aid of a current of air. There was obtained as a residue 18.7 g. of p-tolyl N,N-dimethylthiolcarbamate, $n_D^{30}$ 1.5766.

Example XV (R-2170)

When the general procedure of Example XIV was repeated except that sodium dispersion equivalent to 1.1 g. (0.048 mole) of sodium, 7.8 g. (0.051 mole) of p-ethoxybenzenethiol and 5.0 g. (0.046 mole) of dimethyl carbamyl chloride were employed, there was obtained 8.6 g. of p-ethoxyphenyl N,N-dimethylthiolcarbamate, M.P. 85–86.5°.

Example XVI (R-2171)

When the general procedure of Example XIV was repeated except that sodium dispersion equivalent to 2.4 g. (0.105 mole) of sodium, 15.2 g. (0.110 mole) of 2,4-dimethylbenzenethiol and 10.8 g. (0.100 mole) of dimethyl carbamyl chloride were employed, there was obtained 19.6 g. of 2,4-dimethylphenyl N,N-dimethylthiolcarbamate, $n_D^{30}$ 1.5707.

Example XVII (R-2172)

When the general procedure of Example XIV was repeated except that sodium dispersion equivalent to 2.4 g. (0.105 mole) of sodium, 13.6 g. (0.110 mole) of p-toluenethiol and 13.6 g. (0.100 mole) of diethyl carbamyl chloride were employed, there was obtained 21.2 g. of p-tolyl N,N-diethylthiolcarbamate, $n_D^{30}$ 1.5537.

The compounds of the present invention have been tested as herbicides and found very effective as the following typical tests show. Some of the compounds are quite selective in their action and can be used to eradicate or control one type of plant, while another type of plant is relatively unaffected.

In making the following tests, seeds were planted in 3″ pots and shortly thereafter the compound under test was applied to the pots as a drench at the rate of 365 pounds per acre. The pots were placed in a greenhouse and watered at suitable intervals and the germination and growth of the seeds was compared with similarly planted seeds to which no herbicide was added. In each case, germination was reported on the scale of 0–100%, while growth was reported on a scale of 0–10, based on the seeds which germinated. Thus, 100–10 indicates normal germination and normal growth.

The following data were obtained:

| Compound | Oats Percent Germ. | Oats Growth | Cucumbers Percent Germ. | Cucumbers Growth | Radish Percent Germ. | Radish Growth |
|---|---|---|---|---|---|---|
| R-2097 | 0 | | 0 | | 0 | |
| R-2098 | 0 | | 0 | | 0 | |
| R-2099 | 10 | 3 | 25 | 2 | 75 | 6 |
| R-2101 | 50 | 1 | 100 | 10 | 100 | 10 |
| R-2103 | 50 | 1 | 100 | 10 | 100 | 10 |
| R-2104 | 10 | 0+ | 10 | 2 | 50 | 5 |
| R-2105 | 10 | 1 | 25 | 7 | 50 | 6 |
| R-2107 | 0 | | 0 | | 0 | |
| R-2108 | 10 | 1 | 0 | | 25 | 10 |
| R-2109 | 0 | | 0 | | 10 | 10 |
| R-2111 | 0 | | 0 | | 0 | |
| R-2112 | 15 | 3 | 0 | | 20 | 4 |
| R-2169 | 0 | | 0 | | 5 | 2 |
| R-2170 | 75 | 6 | 0 | | 100 | 10 |
| R-2171 | 0 | | 0 | | 0 | |
| R-2172 | 0 | | 0 | | 50 | 5 |
| R-2110 | 0 | | 10 | 2 | 25 | 4 |

The above tests were then repeated using application rates of 10 and 40 pounds per acre with the following results:

| Compound | Rate/Acre, lb. | Peas Ge.[1] | Peas Gr.[2] | Corn Ge. | Corn Gr. | Radish Ge. | Radish Gr. | Rye Ge. | Rye Gr. | Cucumber Ge. | Cucumber Gr. |
|---|---|---|---|---|---|---|---|---|---|---|---|
| R-2097 | 10 | 100 | 10 | 100 | 9 | 100 | 10 | 0 | | 50 | 7 |
| | 40 | 0 | | 100 | 7 | 75 | 7 | 0 | | 50 | 7 |
| R-2098 | 10 | 100 | 10 | 100 | 10 | 100 | 10 | 5 | 0+ | 50 | 6 |
| | 40 | 50 | 3 | 100 | 7 | 100 | 7 | 0 | | 50 | 6 |
| R-2099 | 10 | 100 | 10 | 100 | 10 | 100 | 10 | 75 | 4 | 100 | 10 |
| | 40 | 100 | 10 | 100 | 8 | 100 | 10 | 5 | 0+ | 100 | 10 |
| R-2101 | 10 | 100 | 10 | 100 | 10 | 100 | 10 | 75 | 8 | 100 | 10 |
| | 40 | 100 | 10 | 100 | 10 | 100 | 10 | 75 | 0+ | 100 | 10 |
| R-2104 | 10 | 100 | 6 | 100 | 10 | 100 | 10 | 25 | 2 | 75 | 10 |
| | 40 | 10 | 0+ | 100 | 6 | 100 | 10 | 0 | | 75 | 10 |
| R-2105 | 10 | 100 | 10 | 100 | 10 | 100 | 10 | 25 | 5 | 100 | 10 |
| | 40 | 100 | 8 | 100 | 6 | 100 | 10 | 0 | | 50 | 9 |
| R-2110 | 10 | 100 | 10 | 100 | 10 | 100 | 10 | 25 | 1 | 100 | 10 |
| | 40 | 100 | 8 | 100 | 8 | 100 | 10 | 0 | | 50 | 7 |
| R-2112 | 10 | 100 | 8 | 100 | 8 | 100 | 10 | 75 | 6 | 100 | 8 |
| | 40 | 50 | 3 | 75 | 4 | 100 | 7 | 0 | | 50 | 5 |

[1] Germination.
[2] Growth.

The compounds of the present invention may be used as preemergence or postemergence herbicides and may be applied in a variety of ways at various concentrations. They may be combined with suitable carriers and applied as dusts, sprays or drenches. The amount applied will depend on the nature of the seeds or plants to be controlled and the rate of application may vary from 1 to 500 pounds per acre. One particularly advantageous way of applying the compounds is as a narrow band along a row crop, straddling the row.

We claim:

1. The method of combatting weeds comprising applying a phytotoxic amount to the soil of a compound selected from the group consisting of phenyl N,N-dimethylthiolcarbamate, phenyl N,n-butylthiocarbamate, and phenyl N-allylthiolcarbamate.

2. The method of claim 1 wherein the compound is phenyl N-n-butylthiolcarbamate.

3. The method of claim 1 wherein the compound is phenyl N-allylthiolcarbamate.

4. The method of claim 1 wherein the compound is phenyl N,N-dimethyl thiolcarbamate.

(References on following page)

References Cited in the file of this patent

UNITED STATES PATENTS

| | | |
|---|---|---|
| 2,060,733 | Hunt et al. | Nov. 10, 1936 |
| 2,160,880 | Loane et al. | June 6, 1939 |
| 2,268,382 | Claud et al. | Dec. 30, 1941 |
| 2,631,935 | Baumgartner | Mar. 17, 1953 |
| 2,650,876 | Stewart | Sept. 1, 1953 |
| 2,723,989 | Harman | Nov. 15, 1955 |
| 2,744,898 | Harman et al. | May 8, 1956 |
| 2,776,196 | Gysin et al. | Jan. 1, 1957 |
| 2,776,197 | Gysin et al. | Jan. 1, 1957 |
| 2,863,899 | Harris | Dec. 9, 1958 |

OTHER REFERENCES

Thompson et al. in "Chemical Abstracts," vol. 41, cols. 3902 to 3913 (3905(g) applied), 1947.

Templeman et al. in "Chemical Abstracts," vol. 41, col. 7039 to 7040, 1947.